Patented Oct. 24, 1939

2,176,890

UNITED STATES PATENT OFFICE 2,176,890

STABILIZED BACTERICIDE

Walter G. Christiansen, Glen Ridge, N. J., assignor to E. R. Squibb & Sons, New York, N. Y., a corporation of New York No Drawing. Application February 20, 1936, Serial No. 64,888

5 Claims. (Cl. 167—71)

This invention relates to solutions of mercury derivatives of substituted phenols. By "mercury derivatives of substituted phenols" it is intended to embrace herein compounds having the general formula

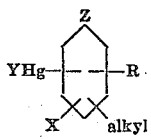

wherein

X represents hydrogen, hydroxy, or an alkyl;
Z represents hydroxy;
Y represents hydroxy or an acetoxy radical; or X and Y, or Y and Z, jointly represent —O—; and
R represents a nitro radical or a halogen.

Such solutions, useful as bactericides, have heretofore been subject to the serious defect that when they are exposed to the atmosphere their solutes readily separate or crystallize out; and this instability, of course, minimizes the length of time and the range of conditions in which the solutions may be efficiently utilized.

It is the object of this invention to provide these solutions in stabilized form.

In the practice of this invention mercury derivatives of substituted phenols are dissolved in dilute alkalies, and the solutions are stabilized by the addition of a colloid. Among the colloids suitable for the purposes of the invention are gelatin, acacia, egg albumin, pectin, casein, lysalbinic and protalbinic acids. Solutions prepared in accordance with the invention show no deterioration on exposure to the atmosphere for relatively long periods.

Example 1

1 g. of acetoxy-mercuri nitro p-tertiary butyl phenol is treated with 8.85 cc. of normal sodium hydroxide solution, and the hydroxy-mercuri nitro p-tertiary butyl phenol formed is dissolved in 50 cc. of water. The excess alkali renders the solution slightly alkaline. Addition of enough water to make 100 cc., followed by dilution with 400 cc. of an aqueous solution containing 2 g. of steam-hydrolyzed gelatin, yields a 1:500 solution of stabilized bactericide active against Bacillus typhosus.

Example 2

1 g. of acetoxy-mercuri chlorothymol is treated with 9.02 cc. of normal sodium hydroxide solution, and the hydroxy-mercuri chlorothymol formed is dissolved in 50 cc. of water. The excess alkali renders the solution slightly alkaline. Addition of enough water to make 100 cc., followed by dilution with 150 cc. of an aqueous solution containing 1 g. of steam-hydrolyzed gelatin, yields a 1:250 solution of a stabilized bactericide active against Staphylococcus aureus. To this solution may be added a similarly prepared solution of acetoxy-mercuri nitro p-tertiary butyl phenol, giving a mixture that constitutes an especially effective bactericide.

Example 3

1 g. of anhydro-mercuri chloro p-tertiary butyl phenol is treated with 7.53 cc. of normal sodium hydroxide solution, and the reaction product is dissolved in 50 cc. of water. The excess alkali renders the solution slightly alkaline. Addition of enough water to make 100 cc., followed by dilution with 400 cc. of an aqueous solution containing 2 g. of hydrolyzed egg albumin, yields a 1:500 solution of an effective stabilized bactericide.

Example 4

Following the procedure of the foregoing examples, 1 g. of 2-acetoxy-mercury 4-n-butyl 6-chloro 1,3-dihydroxy benzene may be dissolved in 8.71 cc. of normal sodium hydroxide (or 1 g. of the 1,2- or of the 2,3-anhydro form of this compound in 9.65 cc. of the alkali solution, and stabilization is effected by means of lysalbinic or protalbinic acid.

It is to be understood that the foregoing examples are merely illustrative and not limitative of the invention, which may be variously otherwise embodied—with respect to the particular mercury derivatives of substituted phenols whose solutions are stabilized, the particular colloids employed, and the specific proportions and procedures—within the scope of the appended claims.

I claim:

1. A stabilized bactericide essentially comprising a slightly alkaline solution of a mercury derivative of a substituted phenol, and a colloid of the group consisting of gelatin, acacia, egg albumin, pectin, casein, lysalbinic acid, and protalbinic acid.

2. A stabilized bactericide essentially comprising a slightly alkaline solution of acetoxy-mercuri nitro p-tertiary butyl phenol, and a colloid of the group consisting of gelatin, acacia, egg albumin, pectin, casein, lysalbinic acid, and protalbinic acid.

3. A stabilized bactericide essentially comprising a slightly alkaline solution of acetoxy-mercuri chlorothymol, and a colloid of the group consisting of gelatin, acacia, egg albumin, pectin, casein, lysalbinic acid, and protalbinic acid.

4. A stabilized bactericide essentially comprising a slightly alkaline solution of anhydro-mercuri chloro p-tertiary butyl phenol, and a colloid of the group consisting of gelatin, acacia, egg albumin, pectin, casein, lysalbinic acid, and protalbinic acid.

5. The method of preparing a stabilized bactericide that comprises dissolving a mercury derivative of a substituted phenol in sufficient dilute alkali to yield a slightly alkaline solution, and adding thereto a colloid of the group consisting of gelatin, acacia, egg albumin, pectin, casein, lysalbinic acid, and protalbinic acid.

WALTER G. CHRISTIANSEN.